United States Patent
Aahlad et al.

(10) Patent No.: US 11,522,966 B2
(45) Date of Patent: *Dec. 6, 2022

(54) METHODS, DEVICES AND SYSTEMS FOR NON-DISRUPTIVE UPGRADES TO A REPLICATED STATE MACHINE IN A DISTRIBUTED COMPUTING ENVIRONMENT

(71) Applicant: WANdisco, Inc., San Ramon, CA (US)

(72) Inventors: Yeturu Aahlad, Foster City, CA (US); Mark Patrick McKeown, Belfast (GB)

(73) Assignee: WANdisco Inc., San Ramon, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/162,088

(22) Filed: Jan. 29, 2021

(65) Prior Publication Data
US 2021/0218827 A1 Jul. 15, 2021

Related U.S. Application Data

(63) Continuation of application No. 16/174,057, filed on Oct. 29, 2018, now Pat. No. 10,944,850.

(51) Int. Cl.
*H04L 67/00* (2022.01)
*G06F 8/65* (2018.01)
*H04L 67/10* (2022.01)

(52) U.S. Cl.
CPC ............... *H04L 67/34* (2013.01); *G06F 8/65* (2013.01); *H04L 67/10* (2013.01)

(58) Field of Classification Search
CPC ............ H04L 67/34; H04L 67/10; G06F 8/65
See application file for complete search history.

(56) References Cited

U.S. PATENT DOCUMENTS

| | | | |
|---|---|---|---|
| 2014/0136751 A1* | 5/2014 | Chang | G06F 13/1657 710/317 |
| 2014/0189004 A1 | 7/2014 | Aahlad et al. | |
| 2016/0105507 A1* | 4/2016 | Aahlad | H04L 67/1095 709/201 |

OTHER PUBLICATIONS

EPO Search Opinion dated Jan. 26, 2022 in EP 19880267.0 (4 pages).

\* cited by examiner

*Primary Examiner* — Joshua D Taylor
(74) *Attorney, Agent, or Firm* — Young Law Firm, P.C.

(57) ABSTRACT

A computer-implemented method and distributed system for maintaining consistency of client applications on a plurality of server nodes may comprise providing a first and second versions of a distributed coordination engine (DConE). The first version of the DConE may receive proposals, reach agreements thereon and generate a first ordering of agreements that specifies an order in which the client applications are to execute the agreed-upon proposals and correspondingly update their respective states. A ChangeVersion proposal may then be processed by the first version of the DConE, whereupon the first version of the DConE may stop reaching any further agreements. A second version of the DConE may then take over reaching agreements on the proposals and generate a second ordering of agreements, beginning with the agreed-upon ChangeVersion proposal. Any agreed-upon proposal, received from the first version of the DConE after the agreed-upon ChangeVersion proposal, may be sent back to the second version of the DConE to enable the second version of the DConE to reach agreement thereon.

27 Claims, 4 Drawing Sheets

SERIALIZE RECEIVED PROPOSALS IN STRICT ORDER TO CREATE GLOBAL SEQUENCE OF AGREEMENTS

METHODS, DEVICES AND SYSTEMS FOR NON-DISRUPTIVE UPGRADES TO A REPLICATED STATE MACHINE IN A DISTRIBUTED COMPUTING ENVIRONMENT

BACKGROUND

The field of the embodiments disclosed herein includes distributed systems. In particular, embodiments are drawn to a distributed system (and the functionality enabled thereby) that uses instances of a distributed coordination engine over a Wide Area Network (WAN) to accept proposals and generate corresponding ordered agreements that are consumed by applications. The distributed coordination engine, however, must be upgraded from time to time, without disrupting the application for which the distributed coordination engine is generating agreements or interrupting the flow of proposals and agreements.

DETAILED DESCRIPTION

Definitions

Figure 1:
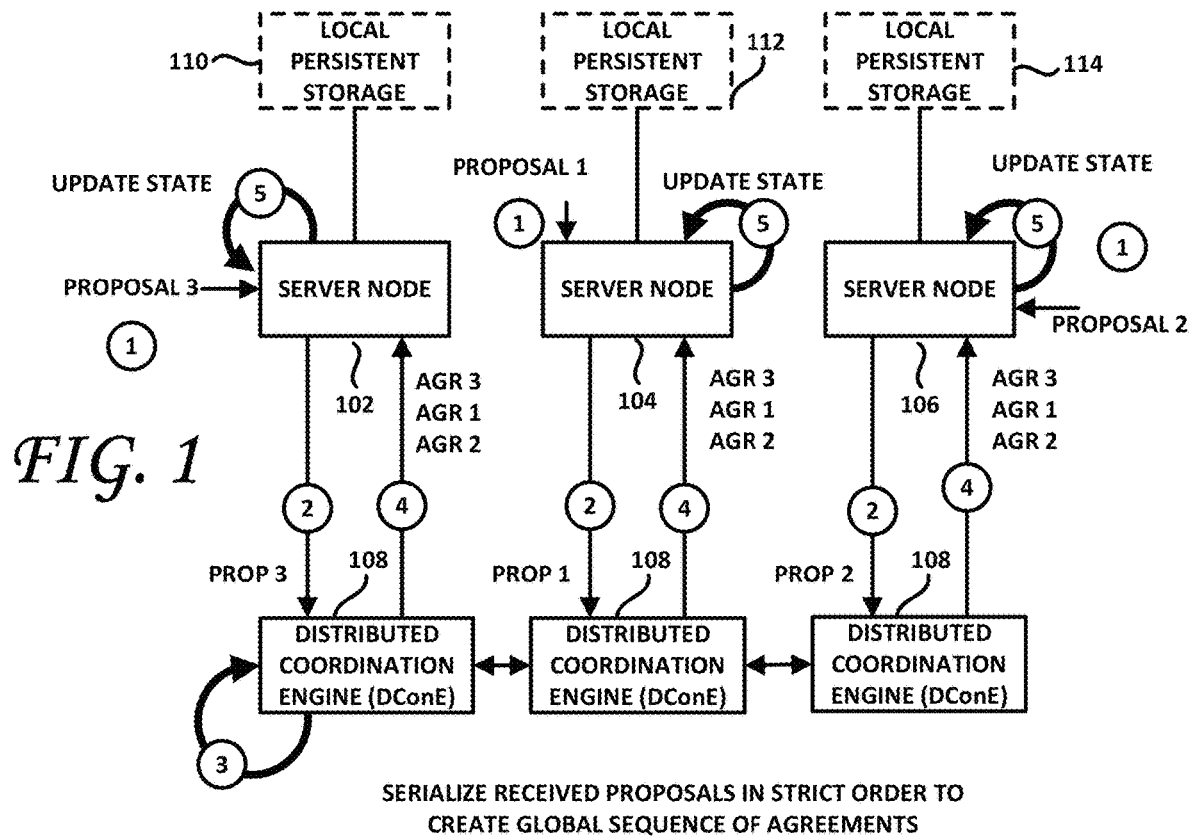
FIG. 1 is a block diagram of a system configured according to one embodiment.

Distributed system: A distributed system comprises a collection of distinct processes that may be spatially separated, and that may communicate with one another through the exchange of messages or events.

Replicated State machine: A replicated state machine approach is a method for implementing a fault-tolerant service by replicating servers and coordinating client interactions with server replicas. These state machines are "replicated" since the state of the state machine evolves identically at all learners. Replicas of a single server are executed on separate processors of a distributed system, and protocols are used to coordinate client interactions with these replicas. One example and implementation of a replicated state machine is a deterministic state machine that consumes its state in a deterministic manner.

Agreements: An agreement is a selected one of a potential plurality of proposal events generated by Proposers and delivered to Learners.

Global sequence of agreements: According to one embodiment, client proposals are submitted to and agreed-upon by at least a majority of Acceptors and delivered in a global sequence of agreements. Server nodes and client applications receiving the global sequence of agreements may then execute the underlying transactions in the order specified by the global sequence of agreements and update their state accordingly, thereby ensuring that all client applications are updated in the same order.

Distributed agreement/co-ordination engine (DConE): One embodiment calls for an agreement or co-ordination engine to generate an ordered global sequence of agreed-upon transactions through a novel production-grade implementation of the Paxos consensus protocol. An exemplary DConE is described in commonly assigned and co-pending US patent application U.S. application Ser. No. 12/069,986 filed on Feb. 13, 2008, which is incorporated herein by reference in its entirety. DConE is a fault-tolerant, continuously available and deterministic replicated state machine. DConE works by collecting events generated by Proposers, organizing them into an ordered global sequence with the help of Acceptors and delivering them in that sequence to Learners. The Learners implement their business logic (implementing transactions, for example) by handling the ordered sequence of delivered events. DConE guarantees delivery of each transaction proposal event at least once to each learner node in the same ordered global sequence of agreed-upon proposals.

Non-blocking: Herein, the term 'non-blocking' refers to the capability of a set of processes to remain fully or partly available while changes are made to that set.

Proposers: According to one embodiment, proposers are processes that are configured and enabled to suggest transactions (proposals to make changes to the state of an application, a data set and the like).

Acceptors: According to one embodiment, acceptors are processes that are configured to participate in deciding on the order of proposals made by proposers. According to one embodiment, only when a majority of acceptors have determined that a proposal takes a particular place in the global sequence of agreements does it become an agreement (e.g., an agreed-upon proposal). Acceptors, according to one embodiment, may be configured to only participate in deciding on the order of agreements and do not reason/care about the underlying contents of the agreements (as described herein, the agreement's value is opaque to the DConE). Acceptors may be configured as application-independent entities.

Learners: According to one embodiment, learners learn of agreements made between the proposers and acceptors and apply the agreements in a deterministic order to the application through their output proposal sequence. In one embodiment, an agreement identity is provided, as is a persistent store that, for each replicated state machine, allows a sequence of agreements to be persistently recorded. Each proposal is guaranteed to be delivered at least once to each Learner in a particular membership.

Distributed Coordination Engine (DConE)

According to one embodiment, DConE implements an enhanced, enterprise version of the Paxos algorithm. Under the Paxos algorithm, a replicated state machine is installed with each node in the distributed system. The replicated state machines then function as peers to deliver a cooperative approach to exchange transaction management that ensures the same transaction order at every node—although not necessarily at the same time. The replicated state machines at the server nodes that implement the Paxos algorithm can fill one of any three roles: (1) Proposers; (2) Acceptors; and (3) Learners. There are three phases in the Paxos algorithm, which may be repeated during the process of reaching consensus: (1) election of a node to be the coordinator or Proposer; (2) broadcast of the transaction proposal to its peers that then assume the role of Learners, who either accept or reject the proposal; and (3) acceptance, once a majority of the nodes acknowledge the Proposer and accept its proposal, allowing consensus to be reached. The replicated state machine that assumed the role of coordinator then broadcasts a commit message to notify all of its peers to proceed with the transaction.

To avoid scenarios where multiple nodes try to act as coordinators for the same proposal, Paxos assigns an ordering to the successive coordinator nodes and restricts each coordinator's choice in selecting a value to be agreed upon for the proposal number. To support this, each node keeps track of the most recent agreed proposal sequence number that it has seen. When a node issues a proposal, it generates a sequence number for the proposal with a value higher than the last one it is aware of and broadcasts it to the other nodes. If a majority of the other nodes reply indicating they have not seen a higher sequence number, the node is then allowed to act as coordinator, or leader for the proposal. At this point, the other coordinators cannot proceed until consensus is reached on the current proposal. The proposer's sequence number cannot be used by other nodes attempting to be coordinator at the same time, and all future proposals must use a higher sequence number to achieve consensus for future transactions.

Achieving Consensus with DConE

In order to understand DConE's approach to distributed transaction processing, the following details the core components of each DConE instance that support its active-active replication capability: the proposal manager, the local sequencer, the agreement manager, and the global sequencer. When a proposal is submitted to the distributed system for processing by a client at any node, the proposal manager component of the local instance of DConE generates a proposal for the transaction, which includes the transaction data. Such transaction data may include at least the ID of the client and the proposed change. The DConE instance then assigns a local sequence number (LSN) to the proposal. The LSN reflects the order in which the transaction was submitted relative to all other transactions at that location. The LSNs need not be consecutive numbers, merely unique. The local sequencer then saves the proposal with the assigned local sequence number to its proposal log. If a network or server outage occurs before the local instance of DConE is able to submit the proposal to its peers during the agreement process described below, it will resubmit that proposal after it recovers.

Next, DConE's agreement manager determines an agreement number, which represents a proposed global sequence number (GSN) for the proposal that the local DConE instance will submit to its peers at other nodes. In accordance with Paxos, the agreement number is simply an increment of the GSN of the last proposal accepted by all of the nodes. This agreement number is then used to obtain consensus about the ordering of the proposal across all of the nodes, so that one-copy equivalence is maintained. The proposal with the agreement number may then be written to the agreement log. Each DConE instance's agreement log or replicated ledger contains at least all completed agreements, regardless of the server node at which the completed agreements originated. In the event of a network outage, the agreement log will indicate where the node left off before it lost its connection to the other nodes in the distributed system, making it useful during DConE's automated recovery process.

An agreement protocol may then be initiated by the local DConE instance's agreement manager, and the proposal may be submitted to its peers. Once a quorum of the DConE instance's peers reach agreement on the proposal, the agreement number is used as the GSN across all of the nodes as global transaction ordering has now been achieved. The quorum concept enables DConE to reach agreement without requiring that all nodes are available or agree. The quorum concept is a significant element of DConE's performance as well as its fault tolerance.

If agreement is pre-empted by a competing proposal, the agreement manager repeatedly attempts to reach agreement with a new agreement number. Each time agreement is reattempted, an entry with the new agreement number is created in the agreement log. Once agreement is reached by a quorum, the local application node enqueues the agreed upon proposal in its global sequence. At this point the local DConE instance passes the transaction off to its respective locking scheduler for processing, in the agreed global sequence number order. It is important to note that the DConE instance where the proposal originated does not wait for any of the other nodes to complete execution of the transaction; it only waits for agreement to be reached, allowing users to experience LAN-speed performance over a WAN.

Preserving the Local Sequence

Because DConE supports concurrent agreements for performance reasons, it is possible for the quorum to reach agreement out of order. That is, it is possible for an agreement to be reached on a proposal that was submitted after a prior-submitted and not yet agreed-upon proposal at another node.

Recall that DConE, takes proposals from multiple server nodes, collates them into a unique global order and makes it accessible to every other server node. Consider also an application built on top of DConE. Sometimes it is desirable, for a given server node, to implement a first-come-first-served or First-in-First-Out (FIFO), process in handling of the proposals based on their time of arrival and make sure that they are output in the same order. This kind of ordering maybe mandated, for example, by a fairness policy or causal ordering constraint, which are two requirements that are met, according to one embodiment, by the capturing and reaching consensus on all proposals issued by the plurality of server nodes. Any post-processing is carried out in a deterministic way. As the output resulting from DConE is identical across all server nodes, a property of DConE, the output from the post-processing step will result in an identical sequence of agreement on all server nodes, which are then consumed in the GSN-mandated order to maintain consistency across all applications.

The following illustrates one embodiment that enables DConE to determine global transaction ordering while preserving the local sequence of submission of proposals. Assume that a server node submits its first two proposals to DConE and the proposal manager assigns LSN 1 and LSN 2 to the respective proposals. Assume further that a total of 25 proposals with GSNs 1 through 25 have been agreed, and no intervening proposals have been submitted by the other server nodes. Assume further that the quorum reached agreement on LSN 2 before reaching agreement on LSN 1. If local sequence didn't matter to the application, then LSN 2 would have agreement number and GSN 26, and LSN 1 would have agreement number and GSN 27. The proposals would then be written in that order at all of the server nodes. If the requirement is to ensure that local sequence is preserved at all of the nodes regardless of where the proposals originate, one embodiment uses a combination of the LSN, the agreement number, which in this case may or may not end up being the GSN, and the proposer id, which represents a globally unique identifier for the DConE instance where the proposal originated, to construct a global sequence that preserves the local sequence order. In effect, the global sequence is sorted in local sequence order within proposer id and passed to the locking scheduler, discussed hereunder, at each server node.

The Locking Scheduler

The locking scheduler at each server node that DConE passes agreed-upon proposals to the application running at each of the server nodes. The locking scheduler behaves like a database scheduler, not a distributed lock manager. The term "locking scheduler" comes from the fact that it relies on the locks specified by the application for concurrency control, so that large numbers of non-conflicting transactions can be processed in parallel. The locking scheduler is agnostic with respect to the global order. The order in which the locking scheduler submits transactions to the underlying application at each site is driven by a local queue of globally sequenced events (the GSN queue) passed to it from its respective DConE instance at that server node. This allows completely local locking schedulers at each server node to achieve one-copy equivalence without any knowledge of global state. In one embodiment, it is the locking scheduler that interfaces with the underlying application, and not DConE directly.

Achieving Performance and Scalability

DConE significantly extends the functionality of the Paxos algorithm, thereby enabling enhanced performance at scale. Such extended functionality includes quorum, concurrent agreement handling, backoff and collision avoidance, dynamic group evolution, distributed garbage collection, distinguished and fair round numbers for proposals and weak reservations, to identify but a few areas encompassed by such extended functionality.

Quorum

The quorum concept used by DConE allows performance to be optimized and the impact of network and server outages to be minimized based upon the distribution of clients and activity across server nodes. The quorum configuration options that are available include majority, singleton and unanimous. The distributed system may be configured to operate with consensus being achieved by majority quorum, although singleton and unanimous consensus are also possible. In majority quorum, a majority of the server nodes are required to respond to any proposal. DConE also supports the concept of a distinguished node that can act as a tie-breaker in the event that there is an even number of server nodes in the distributed system. With a singleton quorum, only one node has to respond to proposals. The server node selected to be the singleton quorum under this configuration may be that server node having the greatest number of clients and level of trading activity. The benefit is that no wide area network (WAN) traffic is generated during the agreement process at the server node with the highest transaction volume. Agreement is handled entirely by the local DConE instance at the quorum node. The other server nodes submit their proposals to obtain agreement from the singleton quorum node, but typically experience fast performance because they only require the designated singleton server node to agree to their proposals, not complete execution of them, before they hand them off to their respective local locking schedulers. Unanimous quorum requires all server nodes to respond and is inherently the least efficient configuration and the configuration that generates the most WAN traffic.

DConE also supports rotation of the quorum from one region to another based on a follow-the-sun model. This allows performance to be optimized on the basis of normal working hours at each site in a globally distributed system. In addition, the quorum approach works in combination with DConE's automated recovery features to minimize the impact of network outages and server crashes on a distributed system.

Concurrent Agreement

The Paxos algorithm only allows agreement to be reached on one proposal at a time. This has the obvious effect of slowing down performance in a high transaction volume environment. DConE allows multiple proposals from multiple proposers to progress simultaneously, rather than waiting for agreement to be reached by all or a quorum of the server nodes on a proposal by proposal basis.

Back-Off and Collision Avoidance

DConE provides a backoff mechanism for avoiding repeated pre-emption of proposers by their peers. Conventional replicated state machines allow the preempted proposer to immediately initiate a new round with an agreement number higher than that of the pre-emptor. This approach can lead an agreement protocol to thrash for an extended period of time and severely degrade performance. With DConE, when a round is pre-empted, the DConE instance which initiated the proposal computes the duration of back-off delay. The proposer then waits for this duration before initiating the next round. DConE uses an approach similar to Carrier Sense Multiple Access/Collision Detection (CSMA/CD) protocols for nonswitched ethernet.

Automated Backup and Recovery

DConE's active-active replication capability delivers continuous hot backup by default by turning every server node into a mirror of every other. This is leveraged to provide automated recovery over a WAN, or a LAN when a server node falls behind due to network or server failures. No manual intervention is required. If a server node in the distributed system loses contact with its peers, but is still available to clients at its location, those clients will still have read access to the distributed system but will not be allowed to initiate proposals, as the agreement process cannot proceed. This prevents a split-brain scenario from arising that would result in the server node going out of sync with its peers, thus violating the requirement for one copy equivalence across all of the server nodes. However, proposals can still be submitted at the remaining server nodes, provided that a quorum is still available. This minimizes the impact of network outages and server failures on the distributed system. As soon as the failed server node comes back online, its DConE instance catches up automatically with all of the proposals agreed by its peers while it was offline. This may be accomplished by using the agreement log. The agreement log contains the last agreed-upon proposal at the server node before the outage occurred. When the recovery process begins, the server node's DConE instance requests all agreements after the last transaction recorded in its agreement log from its peers. In addition, any proposals left in the proposal log that did not complete the agreement process are automatically resubmitted by the local DConE instance, once the catch-up is complete. This means that regardless of whether an outage occurs before or after agreement is reached on any proposals across the server nodes in a distributed system, no data will be lost.

In addition, DConE's automated recovery capabilities eliminate the need for disk mirroring solutions that only work over a LAN, not a WAN, and require administrator intervention to achieve recovery. As a result, these solutions can introduce the risk of extended downtime and data loss due to human error. Finally, DConE's automated recovery features also make it possible to take servers offline for maintenance without disrupting user access, since clients can be redirected to a server node at another site while theirs is offline. This makes full 24-by-7 operation possible in a globally distributed environment.

FIG. 1 is a diagram of a distributed system using a distributed coordination engine (DConE) according to one embodiment. According to one embodiment, a (preferably odd) plurality (e.g., 3, 5, 7 . . . ) of server nodes may be provided and coordinated, over a computer network, by a single DConE 108 or separate instances of DConE 108. For purposes of illustration only, three server nodes 102, 104, 106 are shown in FIG. 1, each coupled to an instance of DConE 108. Indeed, DConE 108 may be configured as an agent or instance at each node or cluster of nodes (which may be widely separated from one another), with the agents or instances coordinating with each other over a network such as a LAN or a WAN such as the Internet. According to one embodiment, agreements generated by the DConE instances 108, initiated on one of the server nodes 102, 104 or 106, are propagated to the other server nodes in a consistent way by the DConE 108. In this manner, the customer's applications can rely upon consistent, ordered agreements that are distributed and/or replicated across all server nodes coupled to the distributed system. The replication methods disclosed herein provide an active-active model of high availability for a distributed system and allow load-balancing between the constituent server nodes of the distributed system.

The DConE 108 may be configured to determine the global order of agreements (e.g., updates to a distributed ledger that records all transactions occurring in an exchange or marketplace, changes to version-controlled software project, and/or changes to any distributed database or client application). As all replicated state machines or client applications begin in the same state and as all server nodes are caused to apply updates in the same deterministic order (but not necessarily, according to embodiments, at the same time), the state of the replicated state machines or client applications will remain consistent (or be brought into consistency) across nodes.

Figure 2:
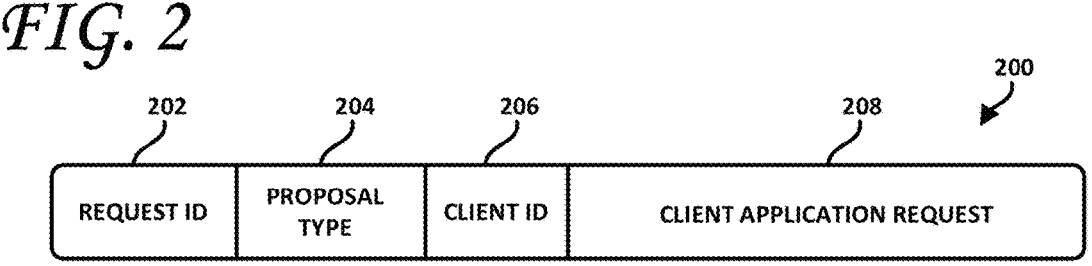
FIG. 2 is a diagram of a proposal according to one embodiment.

According to one embodiment, and as shown in FIG. 1, consistency of agreements over multiple server nodes 102, 104, 106 may be achieved as follows. As shown at (1), one of the server nodes (in this case, server node 102) receives a client request or a proposal from a customer, such as a proposal to make a change to a namespace, the state of an application, a request to buy or sell a specific amount of goods or services that will eventually cause an update to a distributed ledger, a proposal to make a change to a database or a proposal to add data blocks to a file, create a file or create a directory, for example. As shown in FIG. 2, the client requests or proposals 200, according to one embodiment, may be formed as tuples, and each such tuple may include a unique request identifier provided by the client as shown at 202, a proposal type 204 that determines whether the proposal is an application proposal (a proposal to change the state of the application) or a DConE control proposal (a proposal to be used internally by DConE), a unique client identifier 206 and a set of bytes forming the proposal request 208, which forms the payload of the client proposal 200. The payload of the client proposal shown at 208 in FIG. 2, may be opaque to DConE 108. A DConE control proposal, therefore, is targeted to the DConE for processing, rather than a client application. One example of a DConE control proposal is a proposal for the DConE to change its membership, as set out in commonly-owned U.S. Pat. No. 9,332,069, incorporated herein in its entirety.

Returning now to FIG. 1 and the example being developed therein, server node 104 receives a proposal 1 and server node 106 receives a proposal 2. According to one embodiment, rather than server node 102 immediately updating the state of its application with the event (e.g., read, write, delete, etc.) encapsulated within proposal 3, server node 104 immediately updating the state of its application with the event encapsulated within received proposal 1 and server node 106 immediately updating the state of its application, namespace and the like with the event(s) encapsulated within proposal 2, and then propagating such updates to the other ones of the applications in server nodes 102, 104, 106, these separate client requests are passed as proposals, from a persisted shared queue (a relational database, for example) to the DConE 108, which sends these back to the server nodes 102, 104, 106 as an ordered list of agreements, after a majority of Acceptor nodes have reached agreement thereon (agreement being reached consensus by whatever consensus protocol is in place), as described herein.

That is, as shown in FIG. 1, responsive to the receipt of proposal 3 (e.g., client request 3), server node 102 may issue a proposal Prop3 to the DConE 108 as shown at (2). Similarly, responsive to the receipt of proposal 1 (e.g., client request 1), server node 104 may issue a proposal Prop1 to the DConE 108 as shown at (2) and responsive to the receipt of proposal 2 (e.g., client request 2), server node 106 may issue a proposal Prop2 to the DConE 108 as also shown at (2). The DConE 108, according to one embodiment, then obtains agreements through consensus of a majority of Acceptor nodes, serializes the agreed-upon proposals, orders the proposals it receives as shown at (3) and identically feeds those proposals that have been agreed upon as a persisted output queue of globally-ordered agreements (in this case, ordered as AGR3 followed by AGR1 followed by AGR2) back to the applications running in the server nodes 102, 104, 106, as shown at (4). The client applications at server nodes 102, 104 and 106, upon receipt of the ordered sequence of agreements AGR3, AGR1 and AGR2, implement these agreements in that deterministic order, and correspondingly update their respective states such that each is maintained consistent (and/or brought into consistency) across server nodes 102, 104, 106. In this manner, the states of the applications may be asynchronously updated, as suggested at (5), without loss of consistency. These updates may then (but need not) be saved as journal transactions in respective local persistent storage 110, 112, 114 that may (but need not, as indicated by the dashed lines at 110, 112 and 114) be coupled or accessible to the server nodes 102, 104, 106. Then, notifications may be returned to the clients having submitted the client requests as appropriate.

Thus, according to one embodiment, server nodes 102, 104, 106 do not directly record clients' requests, but rather repackage and redirect them as proposals to the DConE 108 for agreement through consensus, serialization and ordering. Updates to the state of applications and/or databases stored at these server nodes are then issued from and by the DConE 108 as a persisted and globally-ordered set of agreements. This guarantees that the application at each server node 102, 104, 106 is updated when the client request is eventually implemented, such that the updates will be transparently and consistently applied to all intended applications in the server nodes in the cluster. In this manner, the state of the applications at each of the plurality of server nodes across the distributed system may be maintained, over time, in a consistent state.

Therefore, a significant role of the DConE 108, according to one embodiment, is to process client requests as proposals received from the server nodes and transform them into a persisted global ordered sequence of agreements. The server nodes (which may be widely separated across geography and time zones) may then implement the changes or transactions underlying the agreements from that globally ordered sequence of agreements and feed the ordered changes or updates to the client's applications.

Figure 3:
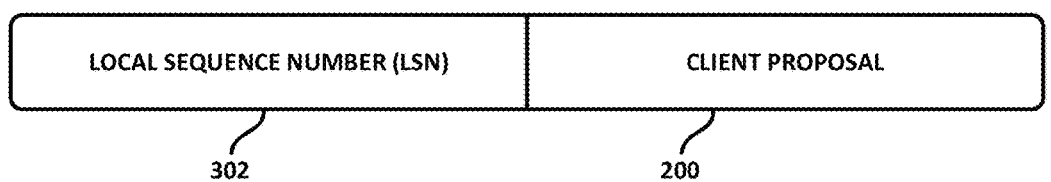
FIG. 3 is a diagram of a client proposal as formatted and/or stored in the input queue, according to one embodiment.

As shown in FIG. 3, a proposal tuple may be encoded in a format that is invariant across DConE versions, whether the proposal is an application proposal or a control proposal. The client proposal 300, as stored in the input queue to the DConE 108, may include the client proposal 200, paired with a local sequence number or LSN 302. In operation, in creating the proposal to be submitted to DConE 108, the server node gives the proposal an LSN, which may be a simple integer. In one implementation, the LSN is local to the server node only. Under normal operation, the DConE 108 process dequeues a client proposal from the input queue, achieves agreement with the other Acceptor nodes and assign a global sequence number (GSN) to the proposal. DConE 108 may then output the thus globally-ordered proposal to a shared persistent output queue called the output queue. In one implementation, a relational database may be used to receive and store the globally-ordered proposals, which are output from the DConE to be consumed by the application or by DConE itself if the proposal is a control proposal. The format of each of the entries in the persisted globally ordered proposals may include the GSN and the proposal. The format and encoding of this may be invariant across DConE versions. The applications at the server nodes then dequeues and processes the agreed-upon and ordered proposal (if it is an application proposal) in the order specified by the GSN order from the output queue. DConE 108 processes any control proposals when, according to the GSN, it is their turn to be execute the agreement.

The GSN may be configured, according to one embodiment, as a unique monotonically increasing number, but may be otherwise configured, as those of skill in this art may recognize. The GSN may also be used to compare the progress of different server nodes in updating the state of their application and to keep the state thereof consistent across server nodes. For example, if server node 102 has just processed an agreement numbered GSN1, which is smaller than GSN2 just processed by server node 104, it follows that the instance of the application at server node 102 is currently in an earlier state than the instance of the application at server node 104.

Figure 4:
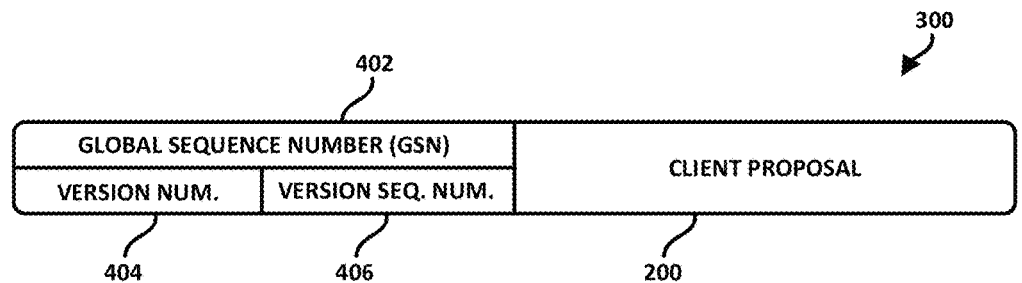
FIG. 4 is a diagram illustrating an agreed-upon proposal (e.g., an agreement), as formatted and/or stored in the output queue according to one embodiment.

According to one implementation and as shown in FIG. 4, the GSN 402 for an agreed proposal 300 may itself be a tuple consisting of two parts, the version number 404 of DConE that the agreement was agreed under and a global sequence number 406 within that version of DConE, in the form of, for example, {version-number, version-sequence-number}. An application will only dequeue and process GSNs from the persisted output queue of agreements that match the current DConE version-number until it is told to change the version-number, which causes the application to begin processing agreements issued from an (e.g., updated) DConE having a different version number. As foreshadowed above, one reason for a DConE having a different version number is the periodic need to update the DConE.

According to one embodiment, read client requests do not require the DConE 108 to reach consensus, only writes. It is to be noted that, according to one embodiment, the DConE 108 does not guarantee that the instances of the underlying client application are identical at all server nodes at all times. Rather, the DConE 108 guarantees that the client applications at the server node 102, 104, 106 will consistently learn about each agreement in the same order as all other server nodes. In this manner, the DConE 108 is configured to generate a globally ordered sequence of agreed-upon proposals that is identically supplied to all server nodes 102, 104, 106 to cause sequentially ordered, predictable updates to the client applications. In turn, this ensures that agreements are consumed by each instance of the client applications executing in each server node in the same order, causing each instance thereof to evolve in a predictable, tamper-proof and deterministic manner.

According to one embodiment, updates to journals stored in local persistent storage 110, 112, 114 may be carried out. However, the consistency of the client applications in the server nodes 102, 104, 106 do not depend on such journal updates and each of the persistent storages (if present), according to one embodiment, is local to a server node and is not shared over the network with other server nodes. Similarly, maintaining the consistency of the client applications across server nodes 102, 104, 106 does not rely upon sharing other resources, such as memory or processor resources.

There is no preferred (master or otherwise distinguished) server node in the distributed system, according to embodiments. Indeed, should one or more server node fails, or is taken offline for maintenance (or for any other reason), other active server nodes are available to serve client requests (proposals) without any interruption in access. According to one embodiment, as soon as a previously down server node comes back online, it may automatically resynchronize with the other server node servers. Such synchronization may comprise learning of all agreed-upon proposals that were issued by the DConE 108 since the server node went down or was taken offline. Both the split-brain condition and data loss are eliminated, as the client applications at all server nodes are always maintained in or brought to synchronism, thereby providing continuous hot backup by default. Both failover and recovery are immediate and automatic, which further eliminates need for manual intervention and the risk of administrator error. Moreover, none of the server nodes 102, 104, 106 is configured as a passive or standby server node. Indeed, according to one embodiment all server node servers in the distributed system are configured to support simultaneous client requests for access to or transactions within the distributed system. Consequently, this enables the distributed system to be readily scaled to support additional server nodes, without sacrificing performance as workload increases. According to one embodiment, there are no passive standby servers in the present distributed system and the vulnerabilities and bottleneck of a single master coordinating server node are eliminated. Moreover, distributing client requests across multiple server nodes 102, 104, 106 (and/or others, not shown in FIG. 1) inherently distributes the processing load and traffic over all available server nodes. Active load balancing across server nodes 102, 104, 106 may also be carried out.

According to one embodiment, a single proposal cannot have a presence in both the input queue to DConE and in DConE's internal persisted state. Indeed, a proposal is either in the input queue or has been dequeued by DConE, processed and internally persisted in, say, a database internal to DConE. Therefore, to safeguard against such failures, at the input side, care is taken to ensure that client proposals are not agreed twice by DConE and, at DConE's output side, that agreed-upon proposals (also referred to herein as "agreements") are not output twice. To achieve this at the input side, according to one embodiment, when DConE dequeues and reads a proposal from its input queue, a check may be carried out to ensure that DConE has not seen the LSN 302 associated with this proposal before. If DConE has previously processed the client proposal 200 associated with the LSN of the just-dequeued proposal, the proposal is dropped, on the assumption that a failure occurred upon dequeuing and/or transferring the proposal form the client queue to DConE 108. Therefore, according to one embodiment, the DConE 108 need not maintain a record of each LSN 3021 it has ready, only the last one. Similarly, to safeguard against failures at DConE's output side, DConE 108 may be configured such that, before it adds an agreement to the output queue, DConE 108 ensures that there is no other agreement in the output queue having the same GSN. Indeed, it is only after DConE 108 has determined that no other agreement associated with the same GSN is already present in its output that it commits the agreement object to its output queue, to thereby address the issue of an agreement being output more than once to the output queue due to failure. To do so, according to one embodiment, DConE's persisted output queue maintains a record of the last GSN that was output from DConE 108.

Handling DConE Application Proposals on Upgrade

Embodiments are also drawn to methods, devices and systems for maintaining consistency of agreements and consistency in the state of client applications in such a distributed system over a WAN, as the distributed coordination engine is being updated. When the DConE engines must be upgraded, the customer must not experience any disruption and the state of the client applications must continue to evolve in a deterministic, predictable fashion, even during changeover from one version of DConE to another version of DConE. To do so, one embodiment calls for the client to interact with the DConE input and output queues using an invariant protocol, in which the process of dequeuing and processing proposals, achieving agreements and outputting agreements is maintained to be continuous during the upgrade process.

Figure 5:
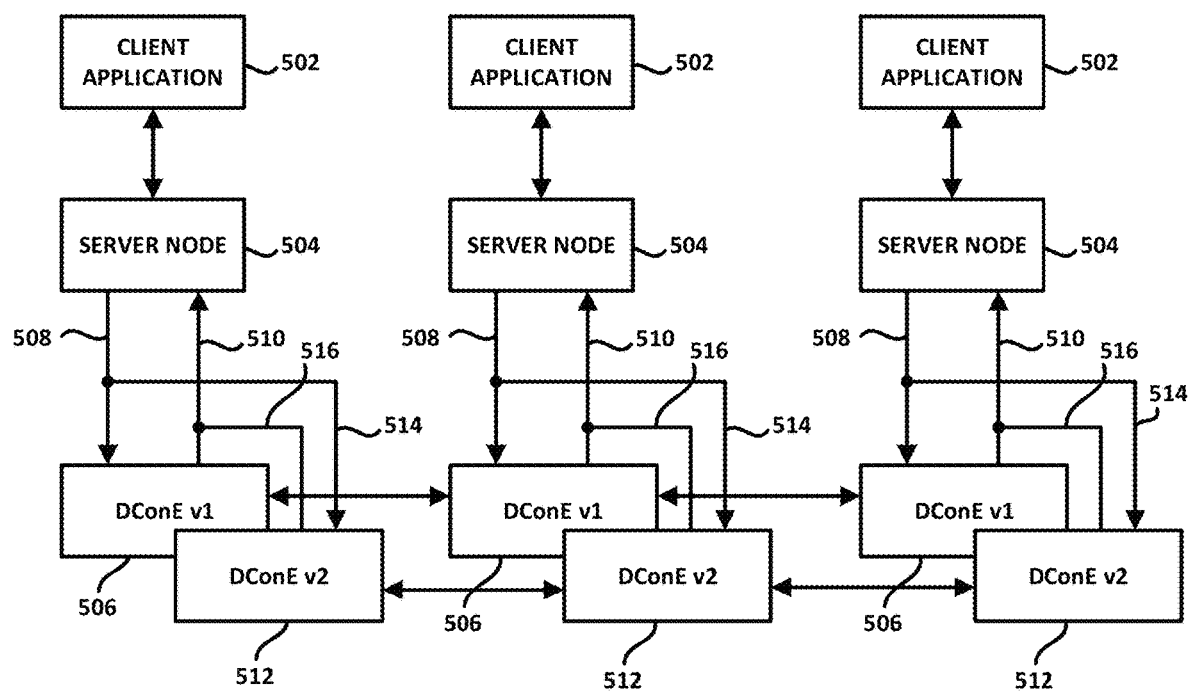
FIG. 5 is a block diagram that illustrates a distributed system according to one embodiment and that shows various aspects of the computer-implemented method of maintaining consistency of client applications in such a distributed system.

Herein, and with reference to FIG. 5, it is assumed that the current version of DConE is DConE is v1 as shown at 506. In operation and as described above, the DConE v1 506 processes are running and making agreements, reading from the DConE input queue 508 and outputting GSN-ordered agreements to the DConE output queue 510. These agreements are processed, in GSN-order, by the client application 502. When it becomes necessary to update DConE 506, another set of DConE processes, DConE v2, shown in FIG. 2 at 512, may be instantiated and started at each node (for example). Each of the instances of the DConE v2 processes 512 may then, according to one embodiment, be connected to the DConE input queue 508 as shown at 514. Similarly, each of the instances of the DConE v2 processes 512 may also be connected to the DConE output queue 510, as shown at 516. Initially, according to one embodiment, DConE v2 512 only monitors the input and output queues 508, 510, but does not process any client proposals.

According to one embodiment, when it is desired to make the changeover from DConE v1 506 to DConE v2 512, a special proposal, herein called a ChangeVersion proposal, may be added to the input queue 508 on each node. The ChangeVersion proposal, according to one embodiment, may include the version number of DConE v2 512. At this stage, both DConE v1 506 and DConE v2 are monitoring the input queue 508, but only DConE v1 506 is processing the proposals and outputting corresponding agreements to its output queue 510. When the ChangeVersion proposal reaches DConE v1 506, it is dequeued and submitted to processing by DConE v1 506. According to one embodiment, the processing of the ChangeVersion proposal by DConE v1 506 effectively directs the changeover from DConE v1 506 to DConE v2 512. According to one embodiment, this ChangeVersion proposal is the last proposal that is dequeued and processed by DConE v1 506, with an agreement on the ChangeVersion proposal being output to the output queue 510. Thereafter, DConE v2 512, being already coupled to the input queue 508 and to the output queue 510, will process all proposals on the input queue 508 subsequent to the ChangeVersion proposal. At this point, both DConE v1 506 and DConE v2 are making agreements and putting the proposals into the output queue 510. However, after receipt and processing of the ChangeVersion proposal by DConE v1 506, DConE v2 512 will be the only one making and outputting agreements onto the output queue 510. In one implementation, the first agreement processed by DConE v2 512 may be associated with an initial, predetermined GSN, such as GSN zero (0). However, other starting GSNs may be used, as long as the selected initial, predetermined GSN has not been used before, as those of skill may appreciate.

In operation and according to one embodiment, the ChangeVersion proposal submitted to the input queue 508 may be processed and agreed to by DConE v1 506, and may be assigned, with reference to FIG. 4, a GSN 402 comprising both a version number 404 and a version sequence number 406, denoted as {v1, X}. According to one embodiment, the client application 502 may be configured such that, when it consumes this {v1, X} agreement, it will stop processing any agreements having a v1 version number 404. That is, the client application 502, upon receipt and consumption of the agreement corresponding to the ChangeVersion proposal, will stop consuming any further agreements from DConE v1 506. Moreover, according to one embodiment, any agreements on the output queue 510 originating from DConE v1 506 that are presented to client application 502 that have a GSN (specifically, a version sequence number 406) greater than the version sequence number of the agreement corresponding to the ChangeVersion proposal client application 502 are then routed and sent back to the input queue 508 where they will be processed by DConE v2 512. For example, when client application 502 is presented with agreement {v1, X+1} and any other agreements from DConE v1 506 having a version sequence number greater than X will be re-routed and sent back to the input queue 508 as corresponding proposals, to be dequeued and agreed by DConE v2 512, with any resulting agreements having a v2 version number. The application 502 may then switch to looking for the agreement {v2, 0}, where 0 is the initial, predetermined version sequence number 406. The new, upgraded DConE v2 512 may then begin processing the proposals on the input queue 508, all the while checking that it has not previously dequeued and processed the same proposal, using the LSN checking mechanism detailed above.

Note that because each of n server nodes generates a ChangeVersion proposal and places it on its respective input queue 508, there will be n corresponding agreements.

According to one embodiment, after seeing a first agreement corresponding to ChangeVersion proposal, the application will thereafter ignore ChangeVersion agreements it encounters for the same version number and does so without re-routing them to the input queue 508; that is, such agreements are not re-proposed. According to one embodiment, if the client application 502 re-proposes a proposal because it has the old version (in the example being developed here, v1) and DConE v1 506 is still processing proposals from the input queue 508, then the proposal will be agreed by DConE v1 506 with a v1 version-number again, and will not be re-proposed again until the DConE v2 process takes over and solely (to the exclusion of DConE v1 506) begins processing proposals and generating corresponding agreements.

Handling DConE Control Proposals on Upgrade

According to one embodiment, once a ChangeVersion proposal has been added to the input queue 508, then any DConE control proposals in the input queue 508 aimed at DConE v1 506 may be either be rejected or converted to be new version DConE proposals; that is, control proposals that are configured to operate on DConE v2 512. This is possible since after the ChangeVersion proposal has been added to the input queue 508, only the newer version of DConE (DConE v2 512) will be reading from the input queue 508. In one implementation, DConE v2 512 may be configured to process legacy proposals, may be configured to reject legacy proposals or may re-write them such that they operate on DConE v2 512 in the same or a similar manner as they were designed to operate on DConE v1 506. According to one embodiment, for a control proposal configured for consumption by DConE v1 506 to be agreed after a ChangeVersion proposal is issued, the v1 control proposal (i.e., control proposal configured for consumption by DConE v1 506) may be added to the input queue 508 before the ChangeVersion proposal, but the agreement process within DConE v1 506 may re-order them on output. The v1 control proposal may then be re-routed and sent back into the input queue 508 for consumption by DConE v2 512 for agreement. In this case, the DConE v2 512 may treat such a control proposal in a number of ways. According to one embodiment, DConE v2 512 may reject the control proposal and inform the client that the control proposal was rejected. This gives the client the opportunity to drop the control proposal or re-format it for consumption by DConE v2 512. Alternatively, DConE v2 512 may accept the legacy proposal if knows how to process it. In some implementations, any later version of DConE may be configured to have the ability to process all or some control proposals from earlier DConE versions. Alternatively still, the later version of DConE—in our example, DConE v2 512—may replace the v1-type control proposal with a v2-type control proposal that is semantically equivalent and achieve agreement thereon.

Turning Off the Old Version of DConE

According to one embodiment, once the newer DConE version is up and running, dequeuing agreements from the input queue 508, processing them and issuing corresponding agreements on the output queue 510, the older DConE it is replacing may be turned off or otherwise prevented from processing further proposals and disabled. However, the instances of the older version of DConE should not be turned off if they still have agreements in flight; that is, proposals that are still being agreed upon and placed on the output queue 510. To address this, according to one embodiment, all instances of DConE v1 506 are checked to ensure that they no longer have any agreements in flight before being turned off. Doing so ensures that no proposals are left unprocessed and/or not resubmitted during a DConE upgrade process.

Figure 6:
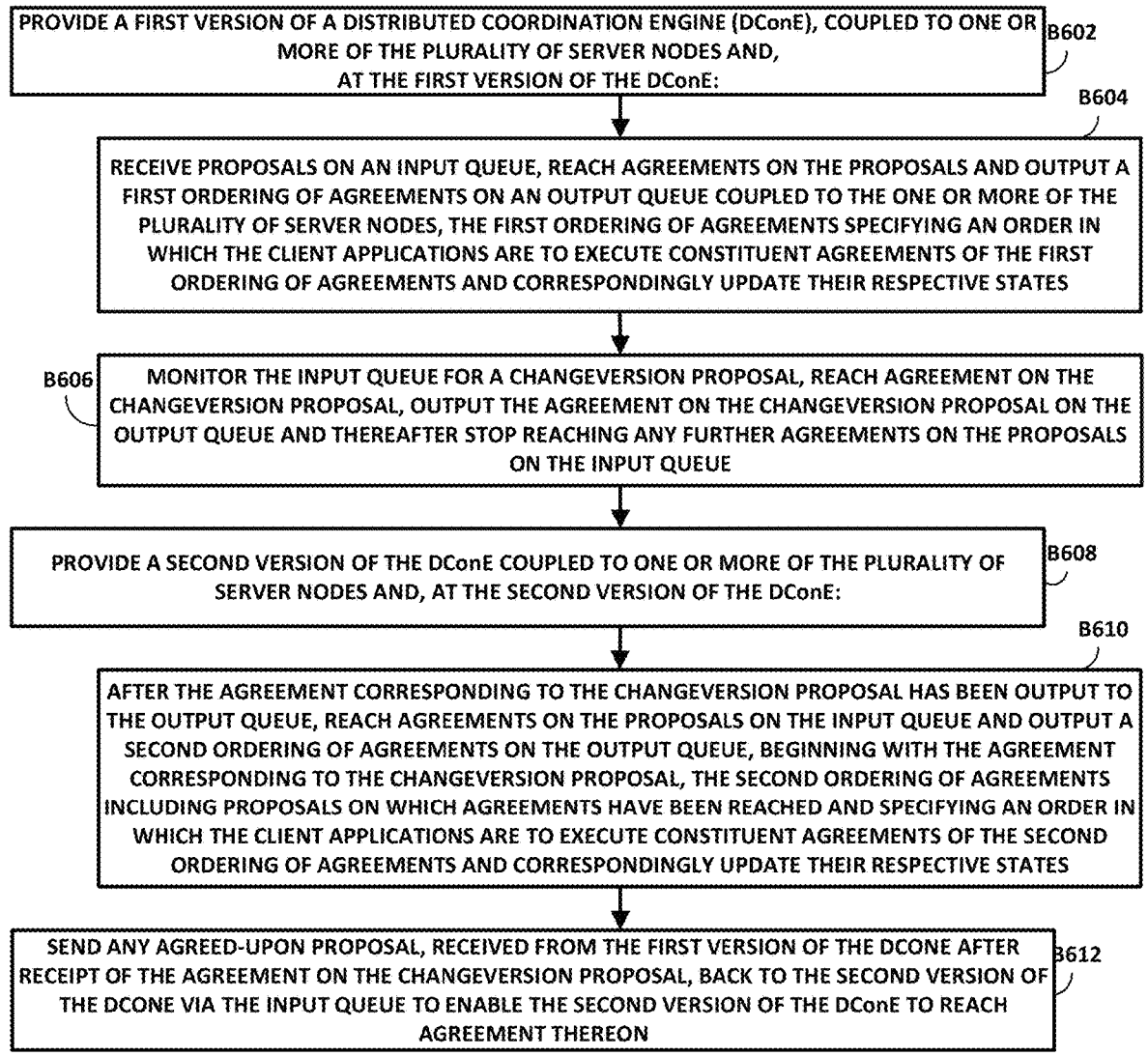
FIG. 6 is a flowchart of a computer-implemented method according to one embodiment.

FIG. 6 is a flowchart of a computer-implemented method according to one embodiment. More particularly, FIG. 6 is a flowchart of a computer-implemented method of maintaining consistency of client applications on a plurality of server nodes. As shown at B602, the method may comprise providing a first version of a distributed coordination engine (DConE), coupled to one or more of the plurality of server nodes. At the first version of the DConE, proposals may be received on an input queue, agreements on the proposals reached and a first ordering of agreements may be output on an output queue coupled to one or more of the plurality of server nodes, as shown at B604. The first ordering of agreements may, as described and shown herein, specify an order in which the client applications are to execute constituent agreements of the first ordering of agreements and correspondingly update their respective states. As shown at B606, the input queue may be monitored for a ChangeVersion proposal, and an agreement reached on the ChangeVersion proposal. The agreement on the ChangeVersion proposal may then be output on the output queue and the first version of the DConE may thereafter stop reaching any further agreements on the proposals on the input queue.

As shown at B608, a second version of the DConE may be provided and coupled to one or more of the plurality of server nodes. As shown at B608, at the second version of the DConE, after the agreement corresponding to the ChangeVersion proposal has been output to the output queue, agreements may be reached on the proposals on the input queue and a second ordering of agreements may be output on the output queue, beginning with the agreement corresponding to the ChangeVersion proposal. As called for by B610, the second ordering of agreements may include proposals on which agreements have been reached and may specify an order in which the client applications are to execute constituent agreements of the second ordering of agreements and correspondingly update their respective states. Thereafter, as shown at B612, any agreed-upon proposal, received from the first version of the DConE after receipt of the agreement on the ChangeVersion proposal, may be sent back to the second version of the DConE via the input queue to enable the second version of the DConE to reach agreement thereon.

According to further embodiments, the first version of the DConE may be turned off, disabled, deleted or otherwise rendered inoperative after the first version of the DConE has finished reaching agreements on any in-flight (agreement currently in-progress) proposals after the agreement corresponding to the ChangeVersion proposal has been reached. Each agreement of the first and second ordering of agreements may comprise a proposal and a global sequence number (GSN) that may comprise a version number of the DConE having reached agreement on the proposal and a version sequence number. Each of the client applications may be configured to only execute proposals whose GSNs comprise a version number that matches a predetermined version number. The predetermined version number may be the current version number or, in an update to DConE has just been implemented, the version number of the updated DConE. In this manner, the method may further comprise changing the predetermined version number from the first to the second version of the DConE. In one embodiment, the sending back of any agreed-upon proposal to the second version of the DConE may be carried out by one of the client applications. According to one embodiment, the proposals may comprise application proposals to make changes to the state of the client applications and/or DConE control proposals that are configured to make control or configuration changes to the first or second version of the DConE. In one embodiment, the second version of the DConE may a) reject a control proposal configured to make control or configurations to the first version of the DConE; b) accept a control proposal configured to make control or configurations to the first version of the DConE and reach agreement thereon; or c) replace a control proposal configured to make control or configurations to the first version of the DConE to a semantically-similar control proposal configured to make control or configurations to the second version of the DConE.

As shown and described herein, one embodiment is a distributed system, comprising a plurality of server nodes, a first version of the DConE and a second version of the DConE. According to one embodiment, each or selected ones of the plurality of server nodes may comprise a client application and may be configured to receive client requests to change a state of the client application and to generate corresponding proposals. The first version of the DConE, coupled to one or more of the plurality of server nodes, may be configured to receive the proposals on an input queue, and may be further configured to reach agreements on the proposals and to output a first ordering of agreements on an output queue coupled to the at least one of the plurality of server nodes. The first ordering of agreements may specify the order in which the client applications are to execute constituent agreements of the first ordering of agreements and correspondingly update their respective states. According to one embodiment, the first version of the DConE may be further configured to monitor the input queue for a ChangeVersion proposal, to reach agreement thereon, to place the agreement on the ChangeVersion proposal on the output queue and thereafter to reach no further agreements on the proposals on the input queue. The second version of the DConE may be coupled to input queue and to the output queue and may be further configured to, after agreement has been reached on the ChangeVersion proposal, reach agreements on the proposals on the input queue and output a second ordering of agreements on the output queue, beginning with the agreement on the ChangeVersion proposal. The second ordering of agreements may include proposals on which agreement has been reached and may specify the order in which the client applications are to execute constituent agreements of the second ordering of agreements and correspondingly update their respective states. According to one embodiment, one or more of the client applications is further configured to cause any agreed-upon proposal received from the first version of the DConE after receipt of the agreement corresponding to the ChangeVersion proposal to be sent back to the second version of the DConE via the input queue, for agreement by the second version of the DConE.

According to a still further embodiment, a computer-implemented method of maintaining consistency of client applications on a plurality of server nodes may comprise providing a first version of a DConE; in the first version of the DConE, reaching agreements on proposals and generating a first ordering of agreements that specifies an order in which the client applications are to execute the proposals agreed-upon by the first version of the DConE and correspondingly update their respective states; providing a second version of a DConE; reaching agreement on a ChangeVersion proposal in the first version of the DConE; stopping reaching agreements on proposals in the second version of the DConE after agreement is reached on the ChangeVersion proposal and generating a second ordering of agreements that specifies an order in which the client applications are to execute the proposals agreed-upon by the second version of the DConE and correspondingly update their respective states; and sending any agreed-upon proposal, received from the first version of the DConE after agreement on the ChangeVersion proposal is reached, back to the second version of the DConE to enable the second version of the DConE to reach agreement thereon.

Physical Hardware

Figure 7:
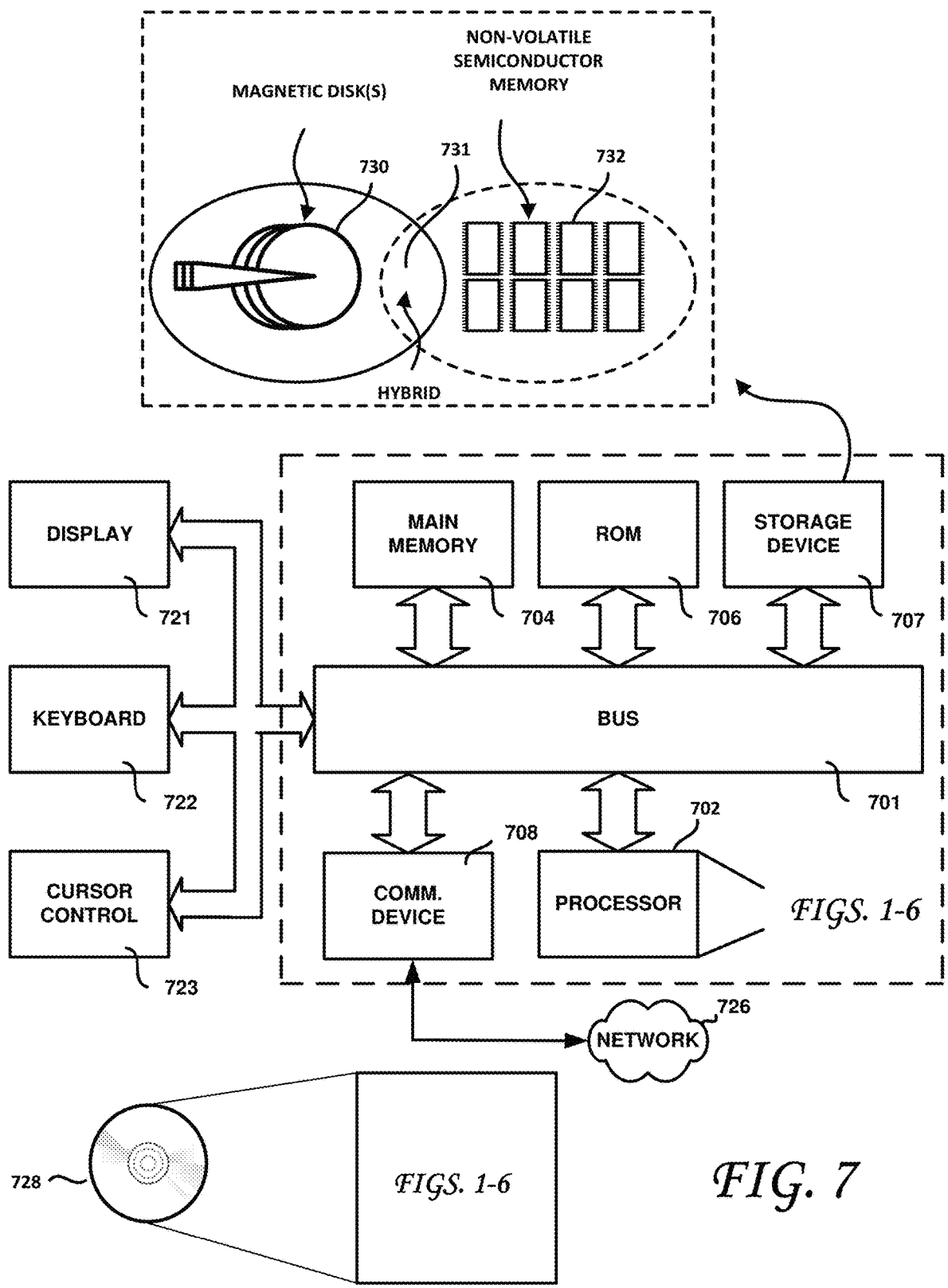
FIG. 7 is a block diagram of a computing device with which the embodiments shown and described herein may be practiced.

FIG. 7 illustrates a block diagram of a computing device with which embodiments may be implemented. The computing device of FIG. 7 may include a bus 701 or other communication mechanism for communicating information, and one or more processors 702 coupled with bus 701 for processing information. The computing device may further comprise a random-access memory (RAM) or other dynamic storage device 704 (referred to as main memory), coupled to bus 701 for storing information and instructions to be executed by processor(s) 702. Main memory (tangible and non-transitory, which terms, herein, exclude signals per se and waveforms) 704 also may be used for storing temporary variables or other intermediate information during execution of instructions by processor 702. The computing device of FIG. 7 may also include a read only memory (ROM) and/or other static storage device 706 coupled to bus 701 for storing static information and instructions for processor(s) 702. A data storage device 707, such as a magnetic disk and/or solid-state data storage device may be coupled to bus 701 for storing information and instructions—such as would be required to carry out the functionality shown and disclosed relative to FIGS. 1-6. The computing device may also be coupled via the bus 701 to a display device 721 for displaying information to a computer user. An alphanumeric input device 722, including alphanumeric and other keys, may be coupled to bus 701 for communicating information and command selections to processor(s) 702. Another type of user input device is cursor control 723, such as a mouse, a trackball, or cursor direction keys for communicating direction information and command selections to processor(s) 702 and for controlling cursor movement on display 721. The computing device of FIG. 7 may be coupled, via a communication interface (e.g., modem, network interface card or NIC) 708 to the network 726.

As shown, the storage device 707 may include direct access data storage devices such as magnetic disks 730, non-volatile semiconductor memories (EEPROM, Flash, etc.) 732, a hybrid data storage device comprising both magnetic disks and non-volatile semiconductor memories, as suggested at 731. References 704, 706 and 707 are examples of tangible, non-transitory computer-readable media having data stored thereon representing sequences of instructions which, when executed by one or more computing devices, implement aspects of the distributed systems and methods described and shown herein. Some of these instructions may be stored locally in a client computing device, while others of these instructions may be stored (and/or executed) remotely and communicated to the client computing over the network 726. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 728. For example, reference 728 may be implemented as an optical (or some other storage technology) disk, which may constitute a suitable data carrier to load the instructions stored thereon onto one or more computing devices, thereby reconfiguring the computing device(s) to one or more of the embodiments described and shown herein. In other implementations, reference 728 may be embodied as an encrypted solid-state drive. Other implementations are possible.

Embodiments of the present invention are related to the use of computing devices to maintain consistency of client applications over a computer network in a distributed system. According to one embodiment, the methods, devices and systems described herein may be provided by one or more computing devices in response to processor(s) 702 executing sequences of instructions, embodying aspects of the computer-implemented methods shown and described herein, contained in memory 704. Such instructions may be read into memory 704 from another computer-readable medium, such as data storage device 707 or another (optical, magnetic, etc.) data carrier, such as shown at 728. Execution of the sequences of instructions contained in memory 704 causes processor(s) 702 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process, such as the computer-implemented data augmentation methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A distributed system, comprising:
   a plurality of server nodes, each comprising a client application and being configured to receive client requests to change a state of the client application and to generate corresponding proposals;
   a first version of a replicated state machine, coupled to at least one of the plurality of server nodes and configured to receive the proposals on an input queue, to reach agreements on the proposals and to output a first ordering of agreements on an output queue coupled to the at least one of the plurality of server nodes, the first ordering of agreements specifying an order in which the client applications are to execute constituent agreements of the first ordering of agreements and the plurality of server nodes to correspondingly update their respective states, the first version of the replicated state machine being further configured to monitor the input queue for a change version proposal, to reach agreement thereon, and to place the agreement on the change version proposal on the output queue, the change version proposal being configured to direct a changeover of subsequent proposals on the input queue from the first version of the replicated state machine to a second version of the replicated state machine;

the second version of the replicated state machine being coupled to input queue and to the output queue, the second version of the replicated state machine being configured to, after agreement has been reached on the change version proposal, reach agreements on the proposals on the input queue and to output a second ordering of agreements on the output queue, beginning with the agreement on the change version proposal, the second ordering of agreements including proposals on which agreement has been reached and specifying an order in which the client applications are to execute constituent agreements of the second ordering of agreements and the plurality of server nodes to correspondingly update their respective states; and wherein the first version of the replicated state machine is configured to send any agreed-upon proposal received after receipt of the agreement corresponding to the change version proposal to the second version of the replicated state machine via the input queue.

2. The distributed system of claim 1, wherein the first version of the replicated state machine comprises an instance thereof for each of the plurality of server nodes and wherein the second version of the replicated state machine comprises an instance thereof for each of the plurality of server nodes.

3. The distributed system of claim 1, wherein the first and second versions of the replicated state machine are coupled to the plurality of server nodes over a computer network.

4. The distributed system of claim 1, wherein the first version of the replicated state machine is disabled after the first version of the replicated state machine has finished reaching agreements on any in-flight proposals after the agreement corresponding to the change version proposal has been reached.

5. The distributed system of claim 1, wherein each agreement of the first and second ordering of agreements comprises:
 a proposal; and
 a global sequence number that comprises a version number of the replicated state machine having reached agreement on the proposal and a version sequence number.

6. The distributed system of claim 5, wherein each of the client applications are configured to only execute proposals whose global sequence numbers comprise a version number that matches a predetermined version number.

7. The distributed system of claim 6, wherein the predetermined version number is selected from the first version of the replicated state machine and the second version of the replicated state machine.

8. The distributed system of claim 1, wherein the proposals comprise at least one of:
 application proposals to make changes to the state of the client applications, and
 replicated state machine control proposals configured to make control or configuration changes to the first or second versions of the replicated state machine.

9. The distributed system of claim 8, wherein the second version of the replicated state machine is further configured to one of:
 reject a control proposal configured to make control or configurations to the first version of the replicated state machine;

accept a control proposal configured to make control or configurations to the first version of the replicated state machine and reaching agreement thereon; and replace a control proposal configured to make control or configurations to the first version of the replicated state machine to a functionally-similar control proposal configured to make control or configurations to the second version of the replicated state machine.

10. The distributed system of claim 1, wherein both first and second versions of the replicated state machines are fault-tolerant and deterministic.

11. The distributed system of claim 1, wherein the second version of the replicated state machine is configured, before receipt of the agreement on the change version proposal, to monitor the input and output queues.

12. A computer-implemented method of maintaining consistency of client applications on a plurality of server nodes, comprising:
 providing a first version of a replicated state machine coupled to at least one of the plurality of server nodes and, at the first version of the replicated state machine:
  receiving proposals on an input queue, reaching agreements on the received proposals and outputting a first ordering of agreements on an output queue coupled to the at least one of the plurality of server nodes, the first ordering of agreements specifying an order in which the client applications are to execute constituent agreements of the first ordering of agreements and the plurality of server nodes are to correspondingly update their respective states; and
  receiving, on the input queue, a change version proposal, reaching agreement on the received change version proposal, outputting an agreement on the change version proposal on the output queue the change version proposal being configured to direct a changeover of subsequent proposals on the input queue from the first version of the replicated state machine to a second version of the replicated state machine;
 providing the second version of the replicated state machine coupled to the at least one of the plurality of server nodes and to the input and output queues of the first version of the replicated state machine and, at the second version of the replicated state machine:
  receiving the agreement on the change version proposal, reaching agreements on the received proposals on the input queue and outputting a second ordering of agreements on the output queue, beginning with the agreement on the change version proposal, the second ordering of agreements including proposals on which agreements have been reached and specifying an order in which the client applications are to execute constituent agreements of the second ordering of agreements and the plurality of server nodes correspondingly are to update their respective states and
 sending any agreed-upon proposal, received from the first version of the replicated state machine after receipt of the agreement on the change version proposal, to the second version of the replicated state machine via the input queue.

13. The computer-implemented method of claim 12, further comprising disabling the first version of the replicated state machine after the first version of the replicated state machine has finished reaching agreements on any in-flight proposals after the agreement corresponding to the change version proposal has been reached.

14. The computer-implemented method of claim 12, wherein each agreement of the first and second ordering of agreements comprises:
 a proposal; and
 a global sequence number that comprises a version number of the replicated state machine having reached agreement on the proposal and a version sequence number.

15. The computer-implemented method of claim 14, further comprising configuring each of the client applications to only execute proposals whose global sequence numbers comprise a version number that matches a predetermined version number.

16. The computer-implemented method of claim 15, further comprising changing the predetermined version number from the first to the second version of the replicated state machine.

17. The computer-implemented method of claim 12, wherein sending any agreed-upon proposal to the second version of the replicated state machine is executed by one of the client applications.

18. The computer-implemented method of claim 12, wherein the proposals comprise at least one of application proposals to make changes to the state of the client applications and replicated state machine control proposals configured to make control or configuration changes to the first or second version of the replicated state machine.

19. The computer-implemented method of claim 18, further comprising the second version of the replicated state machine one of:
 rejecting a control proposal configured to make control or configurations to the first version of the replicated state machine;
 accepting a control proposal configured to make control or configurations to the first version of the replicated state machine and reaching agreement thereon; and
 replacing a control proposal configured to make control or configurations to the first version of the replicated state machine to a semantically-similar control proposal configured to make control or configurations to the second version of the replicated state machine.

20. The computer-implemented method of claim 12, wherein both first and second versions of the replicated state machines are fault-tolerant and deterministic.

21. The computer-implemented method of claim 12, wherein the second version of the replicated state machine is configured, before receipt of the agreement on the change version proposal, to monitor the input and output queues.

22. A computer-implemented method of maintaining consistency of client applications on a plurality of server nodes comprises:
 providing a first version of a replicated state machine and, in the first version of the replicated state machine, reaching agreements on proposals and generating a first ordering of agreements that specifies an order in which the client applications are to execute the proposals agreed-upon by the first version of the replicated state machine and the plurality of server nodes to correspondingly update their respective states;
 providing a second version of a replicated state machine;
 reaching agreement on a change version proposal in the first version of the replicated state machine, the change version proposal being configured to direct a change-over of subsequent proposals on the input queue from the first version of the replicated state machine to the second version of the replicated state machine;
 stopping reaching agreements on proposals in the second version of the replicated state machine after agreement is reached on the change version proposal and generating a second ordering of agreements that specifies an order in which the client applications are to execute the proposals agreed-upon by the second version of the replicated state machine and the plurality of server nodes to correspondingly update their respective states; and
 sending any agreed-upon proposal, received from the first version of the replicated state machine after agreement on the change version proposal is reached, to the second version of the replicated state machine.

23. The computer-implemented method of claim 22, further comprising disabling the first version of the replicated state machine after the first version of the replicated state machine has finished reaching agreements on any in-flight proposals after the agreement corresponding to the change version proposal has been reached.

24. The computer-implemented method of claim 22, wherein the proposals comprise at least one of application proposals to make changes to the state of the client applications and replicated state machine control proposals configured to make control or configuration changes to the first or second version of the replicated state machine.

25. The computer-implemented method of claim 24, further comprising the second version of the replicated state machine one of:
 rejecting a control proposal configured to make control or configurations to the first version of the replicated state machine;
 accepting a control proposal configured to make control or configurations to the first version of the replicated state machine and reaching agreement thereon; and
 replacing a control proposal configured to make control or configurations to the first version of the replicated state machine to a semantically-similar control proposal configured to make control or configurations to the second version of the replicated state machine.

26. The computer-implemented method of claim 22, wherein both first and second versions of the replicated state machines are fault-tolerant and deterministic.

27. The computer-implemented method of claim 22, wherein the second version of the replicated state machine is configured, before receipt of the agreement on the change version proposal, to monitor the input and output queues.

* * * * *